Patented Jan. 5, 1932

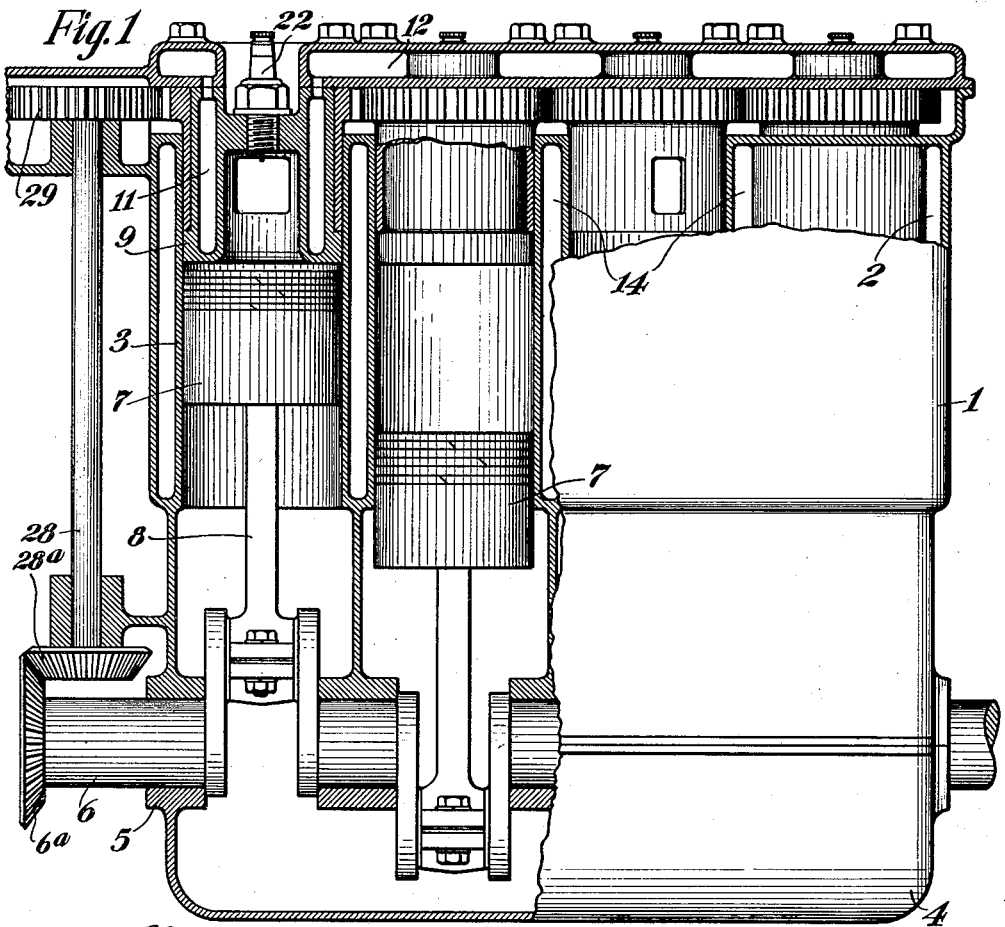

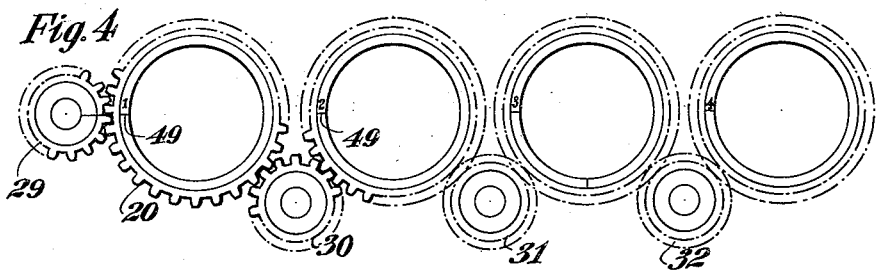
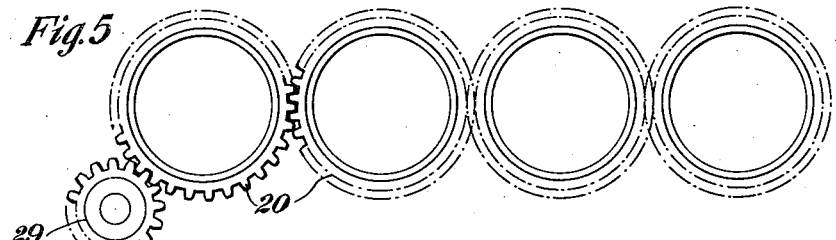
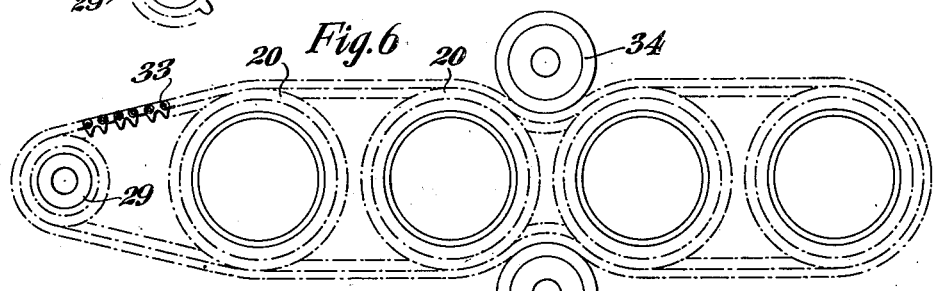
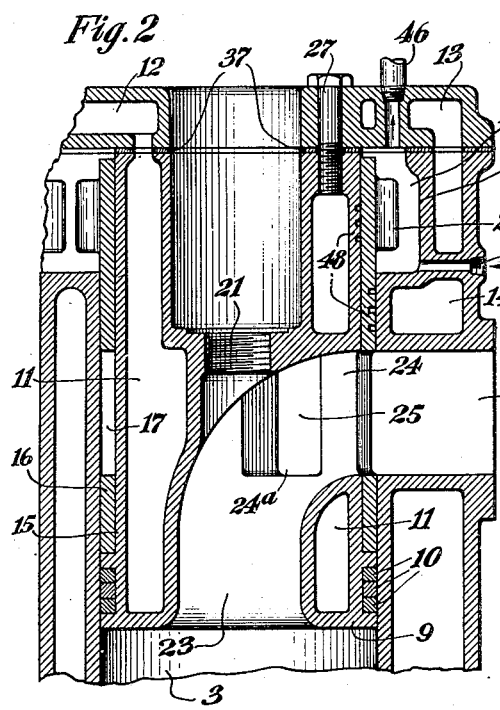
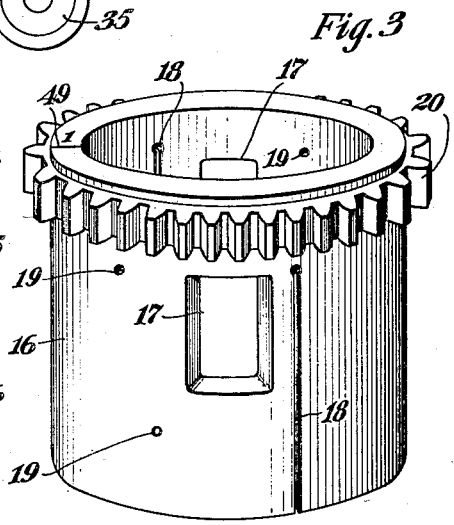

1,839,458

UNITED STATES PATENT OFFICE

JOSEPH A. ANGLADA, OF JENKINTOWN, PENNSYLVANIA, ASSIGNOR TO ANGLADA MOTOR CORPORATION, OF NEW YORK, N. Y., A CORPORATION OF DELAWARE

ROTARY SLEEVE VALVE INTERNAL COMBUSTION ENGINE

Application filed April 30, 1927. Serial No. 187,977.

This invention relates to an improvement in internal combustion engines of the rotary sleeve valve type.

It is an object of the invention to provide an internal combustion engine of the rotary sleeve valve type, having a minimum number of parts, each part of which is of the simple construction and easy to assemble, to produce an engine of this type at the lowest possible cost, which will at the same time be rugged in service, easy to assemble and disassemble for repair and fool proof in the hands of the average mechanic.

Another object of the invention is to provide an engine of this type having an artificially cooled combustion chamber and means for artificially cooling the valve chamber on both the inside and outside thereof, to facilitate the lubrication and sealing of the valve surfaces and thereby prolong the life of the engine.

Another object of the invention is to provide a rotary sleeve valve internal combustion engine, having water cooled cylinders, cylinder heads, and combustion chambers, and having a uniform bore from top to bottom of the cylinders, uniform size of valve sleeves, and uniform size of cylinder heads, facilitating quantity production and standardization of parts, and thereby reducing the original and repair cost of such an engine.

Another object of the invention is to provide a rotary sleeve valve internal combustion engine having the shortest possible artificially cooled valve chamber in which the problem of valve lubrication will be reduced to a minimum because of the reduced area of the lubricated surfaces.

Another object of the invention is to provide a rotary sleeve valve internal combustion engine of the type described with simplified means for driving and timing the valves.

Various other objects and advantages of the invention will appear as the description thereof proceeds.

Referring now to the drawings, which illustrate a preferred form of embodiment of my improved engine, Figure 1 illustrates a part sectional side view through a four cylinder engine, embodying my invention.

Figure 2 is an enlarged sectional view through the top of one of the cylinder heads, illustrated in Figure 1.

Figure 3 is a perspective view of one of the valve sleeves.

Figures 4, 5 and 6 illustrate three embodiments of means for driving the valve sleeve of my improved engine.

Figure 7 is a sectional view through a cylinder head of modified and valve construction.

Figure 8 is a view of a still further modification of the head and valve construction.

Various attempts have heretofore been made to provide a rotary sleeve valve internal combustion engine which will secure the advantages of quiet, noiseless, positive operation of the valves and other advantages known to reside in engine constructions of this type. These attempts have, however, failed from a commercial standpoint because of the complicated design of the engine, because of the failure to solve the mechanical problems of lubrication and of the proper cooling of the valve and combustion chamber, and because of the inherent difficulties of construction assembly and continued operation of parts of complicated design, requiring great accuracy of dimensions and assembling.

It will be found from the following description that the present invention overcomes the causes of commercial failure of previous engines of this type and produces an engine which is at once commercially practicable and commercially profitable because of the complete solution of the problem of cooling the cylinder walls, combustion chamber and valve and because of its simplicity, ruggedness, uniformity of parts, and low cost of production.

In the embodiment of the invention illustrated in Figures 1, 2 and 3, the engine comprises a cylinder block 1, which may be artificially cooled, as indicated at 2, by means of a water jacket or suitable air cooling means and which houses the cylinders 3, which may be of any desired number, arranged in line or separate blocks or in any other desired arrangement. The crank case of the engine is indicated at 4 and provides bearings 5 for the crank shaft 6, which is connected to the pistons 7 by means of connecting rods 8, as in conventional practice.

Each of the cylinders 3 throughout its bore is preferably of a uniform diameter so as to reduce and simplify the machining and grinding thereof, and each cylinder is closed at its upper end by a removable cylindrical head 9, which at its lower end is of approximately the same diameter as the bore of the cylinder 3 and is provided with suitable sealing means 10 forming a tight joint with the cylinder wall at the lower end of the head.

The cylinder head 9 is provided with passages 11 for the circulation of a cooling fluid therethrough and by means of communicating passages 12, through the cylinder block cover 13, is in communication with the cooling passages 2 and 14 surrounding the cylinder walls.

The outer wall of the head 9 is stepped back above the lower portion thereof, forming with the inner wall of the cylinder a recess 15 in which the rotary sleeve valve 16 is received and adapted to rotate. The valve 16 is preferably a cylinder of uniform diameter and size from top to bottom thereof of coparatively short length and is preferably provided with a pair of valve ports 17 and spaced 180° around the surface thereof, and may be provided with a slot 18 in front of each valve port to remove and distribute lubricant along the walls of the valve chamber. Suitable small holes or passages 19 may also be provided through the walls of the valve sleeve to permit the flow of lubricant from one wall to the other.

A gear 20, formed integral with or separate from the top of the valve permits the same to be driven in a manner to be described later.

A recessed spark plug opening 21, adapted to receive a spark plug 22, is provided in the top of the cylinder head 9, and in the bottom of the cylinder head, a recess 23 is provided forming the combustion space, which communicates through passages 24 and 24ª, with the inlet and exhaust openings 25 and 26 through the walls of the cylinder 3.

The cylinder head 9 is suspended within the cylinder 3, by means of bolts or the like 27, securing the cylinder head to the cylinder block cover 13. The cylinder block cover 13 may be in the form of a manifold extended over the entire cylinder block, or, if desired, may be in the form of separate individual cover for each cylinder.

The valve sleeves may be driven in timed relation from the crank shaft 6, through the gears 6ª—28ª, by means of a shaft 28, extending upward along the cylinder block and provided with a gear 29, which meshes with suitable driving means connecting with the gear 20 of each valve sleeve 16.

In the form of driving mechanism, illustrated in Figure 4, the gear 29 meshes with the gear 20 of the valve sleeve of the nearest cylinder which in turn is connected through an idler pinion 30 with the gear 20 of the valve sleeve of the next cylinder, which is in turn connected with the gear of the valve sleeve of a third cylinder, etc., by means of the idler pinions 31, 32, etc., or as illustrated in the modification Figure 5, the gear 29, may be connected directly to the gear 20 of the valve sleeve of the nearest cylinder and the gears 20 of all the valve sleeves mesh together.

Figure 6 shows another form of driving means, in which the gear 29 drives the chain 33, which meshes with the gears 20 of each of the valve sleeves and which may be provided with suitable idler pinions 34 and 35 to keep the drive chain taut, and cause the drive chain to have greater contact with the valve gears.

To insure proper timing of the valve sleeves when assembled and to permit the same to be readily reassembled if removed for any purpose, the tops of the various valve sleeves 16 may be provided with suitable marks 49 including the number of the cylinder in which the valve is to operate so that when assembled in line, the valves will be in proper timing and firing order. The valve sleeves may be removed without disturbing the driving gear connection with the crank shaft so that no retiming in this connection is necessary.

Each of the valve gears 20 extends into a chamber 36 formed between the top of the main bore of the cylinders 3 and the cylinder block cover 13, and which is supplied with lubricant from the crank case or the like under suitably controlled pressures by means of the pipes 45 and 46 to lubricate the valve sleeve drive mechanism as well as the walls of the valves in the valve chambers. It is to be noted that this lubricant circulates through a water jacketed chamber formed by the outer water jacketed cylinder walls, the inner water cooled cylinder head and the cylinder block cover as is described in greater detail in my copending application Serial No. 167,617, filed Feb. 12, 1927. Grooves 48 in the walls of the valve sleeve and cylinder head prevent over lubrication adjacent the valve ports.

Gaskets 37 are provided to seal the connections between the tops of the cylinder, the cylinder block cover and the cylinder heads.

It will be seen that in this construction, I have provided a rotary sleeve valve engine composed of a minimum number of parts of simple construction, providing at the same time an artificially cooled combustion chamber, a valve chamber artificially cooled on all surfaces, a stationary artificially cooled cylinder wall in contact with the piston and other operating advantages as a water cooled lubricating chamber outlined in the objects stated in the present specification.

In addition to the operating advantages, the fact that the cylinders are all of uniform bore, the valve sleeves all short cylinders and the heads of simple cylindrical shape involving only standard casting and machining operations is of a great advantage in manufacturing and assembling my engine.

In the modified forms of embodiment of the invention illustrated in Figure 7 and 8, the cylinder head 9ª of Figure 7, is of uniform diameter from top to bottom, and the space between the bottom portion of the cylinder head, and the inner walls of the cylinders 3, are sealed by means of suitable separate expansion packing rings 38.

In this modification the cylinder head is secured to the cylinder block cover 13ª by means of an upwardly extended wall 39 of the spark plug opening 21ª, which wall projects through an opening in the cylinder block cover 13ª and is secured firmly therein by means of a nut 40, cooperating with the threaded top of the wall 39. The valve gear 20ª in this embodiment is formed as a separate ring and secured on the top of the valve sleeve by means such as the ring nut 43 cooperating with suitable threads on the top of the sleeve.

The spark plug opening 21ª is preferably offset from the center of the cylinder 3 to provide an enlarged water passage 47 to the jacket of the combustion space and to permit reduction in the diameter of the cylinders 3 without interfering with securing or removal of the bolts or studs of the cylinder block cover or the cylinder heads on the cylinders 3.

Figure 8 shows another modified form of cylinder head 9ᵇ which is provided with a shoulder 41 around the top thereof, adapted to receive and act as a seat for a small inset shoulder 42 on the valve 16ª, which provides an inset portion 43 adjacent the top of the valve, on which the valve gear 20ᵇ is mounted to bring the outer edge of the gear teeth within the clearance necessary for adjacent valve gear in small bore engines.

It is understood that various other modifications and changes from those described may be made in the construction of my new engine without departing from the spirit of the invention or the scope of the appended claims, that in lieu of water cooling, any other cooling fluid such as air might be used and that the illustrations and descriptions chosen to explain my invention are to be considered as illustrative of the construction thereof, and not in any manner restrictive to the particular outlines shown.

I claim:

1. In a rotary sleeve valve internal combustion engine having a cylinder block cover, the combination of a cylinder of uniform bore, a cylinder head fitting within the upper end of said cylinder, a portion of said cylinder head projecting through said cover, sealing means between the lower end of said head and the walls of said cylinder, a valve chamber between the head and the cylinder, registering port openings in said cylinder and head, and a rotary sleeve valve in said chamber adapted to open and close said ports, said spacing means and said cylinder head projecting portion being adapted to prevent binding of said sleeve valve.

2. In a rotary sleeve valve internal combustion engine, a stationary water cooled cylinder of substantially uniform bore, a removable water cooled head fitting within the upper end of said cylinder, and suspended therein, having a recessed chamber in the lower end thereof, forming a combustion space, said combustion space being offset with respect to the center of the cylinder, inlet and exhaust openings through the walls of said cylinder communicating with the combustion space in said head, a rotary sleeve valve, between the head and cylinder for controlling said openings, and means to introduce cooling water into said cylinder head, said offset combustion space improving combustion and permitting large cooling ducts on one side.

3. In a rotary sleeve valve internal combustion engine, a stationary water cooled cylinder of substantially uniform bore, a removable water cooled head suspended in the upper end of said cylinder, having a recessed chamber in the lower end thereof forming a combustion space, inlet and exhaust openings through the walls of said cylinder communicating with the combustion space in said head, and a rotary sleeve valve mounted on said head and extending within the bore of said cylinder for controlling said openings, said valve having an inset portion adjacent the top thereof to receive driving means whereby said driving means does not project materially beyond the cylinder.

4. In a rotary sleeve valve internal combustion engine, the combination of a cylinder of uniform bore, a cylinder head fitting within the upper end of said cylinder, and suspended therein, sealing means between the lower end of said head and the walls of said cylinder, a valve chamber between the head and the cylinder, registering port openings in said cylinder and head, a rotary sleeve valve in said chamber adapted to open and close said ports, a valve gear on the upper end of said valve sleeve, and a cylinder cover extending over the cylinder and head and forming with the cylinder a lubricant space housing for said valve gear and water cooled on all sides.

5. In a rotary sleeve valve internal combustion engine, the combination of a water cooled cylinder, a water cooled cylinder head fitting within the upper end of said cylinder and a water cooled cylinder cover extending over the cylinder and head, packing means between the lower end of said head and cylinder, a valve chamber between said head and cylinder, a cylindrical sleeve valve in said chamber, valve gearing on the upper end of said valve, and a water cooled lubricant space around said valve gearing and means to drive said valve from the crank shaft of said engine.

6. In a rotary sleeve valve internal combustion engine, the combination of a stationary cylinder of uniform bore, a removable cylindrical head fitting within the end of said cylinder above the piston-stroke and forming a combustion chamber, said chamber being offset and contacting with the walls of the cylinder at its lower end, a portion of reduced diameter above the cylinder contacting portion of said head, forming with the cylinder walls a valve chamber, and a cylindrical valve sleeve rotatable in said chamber, said cylinder head being water cooled, and means to introduce water thereto in greater volume on one side than on the other.

7. In a rotary sleeve valve internal combustion engine, a stationary water cooled cylinder block including a plurality of cylinders of substantially uniform bore having an enlargement at the top of the bore, a removable water cooled head suspended in the upper end of each cylinder with a recessed chamber in the lower end thereof forming a combustion space, said chamber being offset from the center of the cylinder, inlet and exhaust openings through the walls of said cylinders communicating with the combustion space in said heads and a rotary valve sleeve mounted on each head, and extending within the bore of each cylinder for controlling said openings, a valve gear on said sleeves extending into said enlargement, and a cover extending over said cylinder block, heads and valves, having passages for the flow of cooling fluid between the cylinder block and heads, and enclosing the valve gear, and providing a lubricant space around the same, said head having an integral projection extending through said cover, and means to secure said head to said cover co-operating with said projection.

8. In a rotary sleeve valve internal combustion engine, a water cooled cylinder of substantially uniform bore, a water cooled cylinder head suspended and fitting within said cylinder, a valve sleeve between the cylinder and head and a water cooled cylinder cover over said cylinder and head, said cylinder, head and cover providing a water cooled combustion chamber, a valve chamber water cooled on all sides, and a valve lubricant chamber water cooled on all sides.

9. In a rotary sleeve valve internal combustion engine, having a cylinder head cover forming a water jacket, the combination of a cylinder of uniform bore, a water-jacketed cylinder head fitting within the upper end of said cylinder but not connected thereto, a recess in the walls of said head forming with the cylinder walls, a valve chamber, registering port openings through the walls of the cylinder and head, and a cylindrical valve sleeve in said chamber, adapted to open and close communication through said port openings, and means to maintain the spacing of said valve chamber with reference to the cylinder at both the top and bottom of the cylinder head including a single rigid connection between said cylinder head and cover and a gas tight sealing means between the cylinder head and cylinder at the bottom of the cylinder head, said connection adapted to removably suspend said head within said cylinder.

10. In a rotary sleeve valve internal combustion engine having a water-jacketed cylinder block cover, a cylinder block, having therein a plurality of cylinders of uniform bore, a removable jacketed cylinder head fitting within the upper end of each cylinder and suspended therein, having gas tight sealing means between the lower end of the head and cylinder to maintain the spacing of the head and cylinder at the lower end of the head, and having a space between the upper end of the head and cylinder, rotary sleeve valves in said spaces, having a valve gear at the upper end, a single projection on said cylinder head, said projection extending through said cover to secure said head to said cover and maintain the spacing of the head and cylinder at the upper end of the head, means for driving said valve sleeves in timed relation from the crank shaft of the engine including a drive chain extending around said valve gears and meshing with each, and means forming part of the cylinder block cover to enclose said valve gear and chain.

In testimony whereof I have affixed my signature to this specification.

JOSEPH A. ANGLADA.